United States Patent [19]

Bartoschek et al.

[11] Patent Number: 5,161,780
[45] Date of Patent: Nov. 10, 1992

[54] SPINDLE SEAL FOR A SHUTOFF VALVE

[75] Inventors: Manfred Bartoschek, Frankenthal, Fed. Rep. of Germany; Primo Lovisetto, Vicenza, Italy

[73] Assignee: KSB Aktiengesellschaft, Frankenthal/Pfalz, Fed. Rep. of Germany

[21] Appl. No.: 730,867
[22] PCT Filed: Jan. 9, 1990
[86] PCT No.: PCT/EP90/00041
    § 371 Date: Jul. 22, 1991
    § 102(e) Date: Jul. 22, 1991
[87] PCT Pub. No.: WO90/08285
    PCT Pub. Date: Jul. 26, 1990

[30] Foreign Application Priority Data

Jan. 21, 1989 [DE] Fed. Rep. of Germany ....... 3901699

[51] Int. Cl.⁵ .................................. F16K 41/04
[52] U.S. Cl. .................. 251/214; 277/183; 277/189
[58] Field of Search ........... 251/214; 277/181, 189, 277/182, 183, 184

[56] References Cited

U.S. PATENT DOCUMENTS

| | | | |
|---|---|---|---|
| 1,201,870 | 10/1916 | Reed | 277/183 |
| 1,224,449 | 5/1917 | Dean | 277/183 |
| 2,479,398 | 8/1949 | Parsons | 277/183 |
| 2,595,878 | 5/1952 | Parsons | 277/183 |
| 2,622,838 | 12/1952 | Stevenson | 251/31 |
| 3,048,362 | 8/1962 | Scarborough | 251/214 |
| 3,051,434 | 8/1962 | Gulick | 251/167 |
| 3,687,017 | 8/1972 | Lewis | 92/165 |
| 4,285,498 | 8/1981 | Nightingale | 251/214 |
| 4,363,463 | 12/1982 | Moon, Jr. | 251/214 |
| 4,513,770 | 4/1985 | Davy | 277/183 |

FOREIGN PATENT DOCUMENTS 2252532  5/1974  Fed. Rep. of Germany .

Primary Examiner—George L. Walton
Attorney, Agent, or Firm—Peter K. Kontler

[57] ABSTRACT

A gate valve has a housing which accommodates a valve seat as well as a valving element designed to cooperate with the valve seat. The valving element is mounted on a stem which extends through a cover of the housing and functions to move the valving element into and out of engagement with the seat. A sealing unit for the stem is located adjacent the cover and includes a deep drawn, sheet metal carrier which is mounted on the housing and has a central socket. The stem passes through the socket, and the sealing unit further includes one or more sleeve-like seals which are disposed in the socket and surround the stem. The carrier has a flange which extends outwards from the socket to the housing wall. A corrugation is formed in the flange and abuts the housing wall to thereby center the carrier.

13 Claims, 2 Drawing Sheets

SPINDLE SEAL FOR A SHUTOFF VALVE

BACKGROUND OF THE INVENTION

The invention relates to a spindle seal for a valve.

In the known cast and steel valves, sealing chambers for the spindle seal are preferably formed in thick-walled housings or housing covers. It is further known to place a stuffing box packing or ridged packing ring serving as a spindle seal in a seal carrier which is separate from the housing or cover of the valve.

Thus, a carrier socket for a ridged packing ring is known from the German Offenlegungsschrift 2 252 532 and lies on a shoulder formed in the valve housing. The socket, which fills the space between the inner wall of the housing and the seal, is by nature a thick-walled component. The outer surface thereof which is in contact with the housing wall serves for centering.

A socket accommodating the rings of a stuffing box packing which surrounds the valve spindle is known from the U.S. Pat. No. 2,622,838. The socket is here located in the cover of the valve housing. It again constitutes a component which completely fills the space between the seal and the inner wall supporting the socket.

Thick-walled seal carriers having an outer contour matched to an inner wall which receives the carrier are acceptable only where the gap between the inner wall and the spindle seal is not large. Furthermore, the solutions found for the thick-walled valves and seal carriers cannot be readily transferred to sheet metal valves since their substantially thinner walls are unable to have chambers formed therein.

SUMMARY OF THE INVENTION

It is an object of the invention to provide a shutoff valve seal whose seal carrier is also suitable for sheet metal housings. According to the invention, the object set forth is achieved by a sheet metal seal carrier having a peripheral centering section which is in surface-to-surface contact with the wall of the valve housing and is formed by an arch of the carrier.

BRIEF DESCRIPTION OF THE DRAWINGS

The invention is described in greater detail with reference to the accompanying drawings wherein.

DESCRIPTION OF THE PREFERRED EMBODIMENTS

Figure 1:
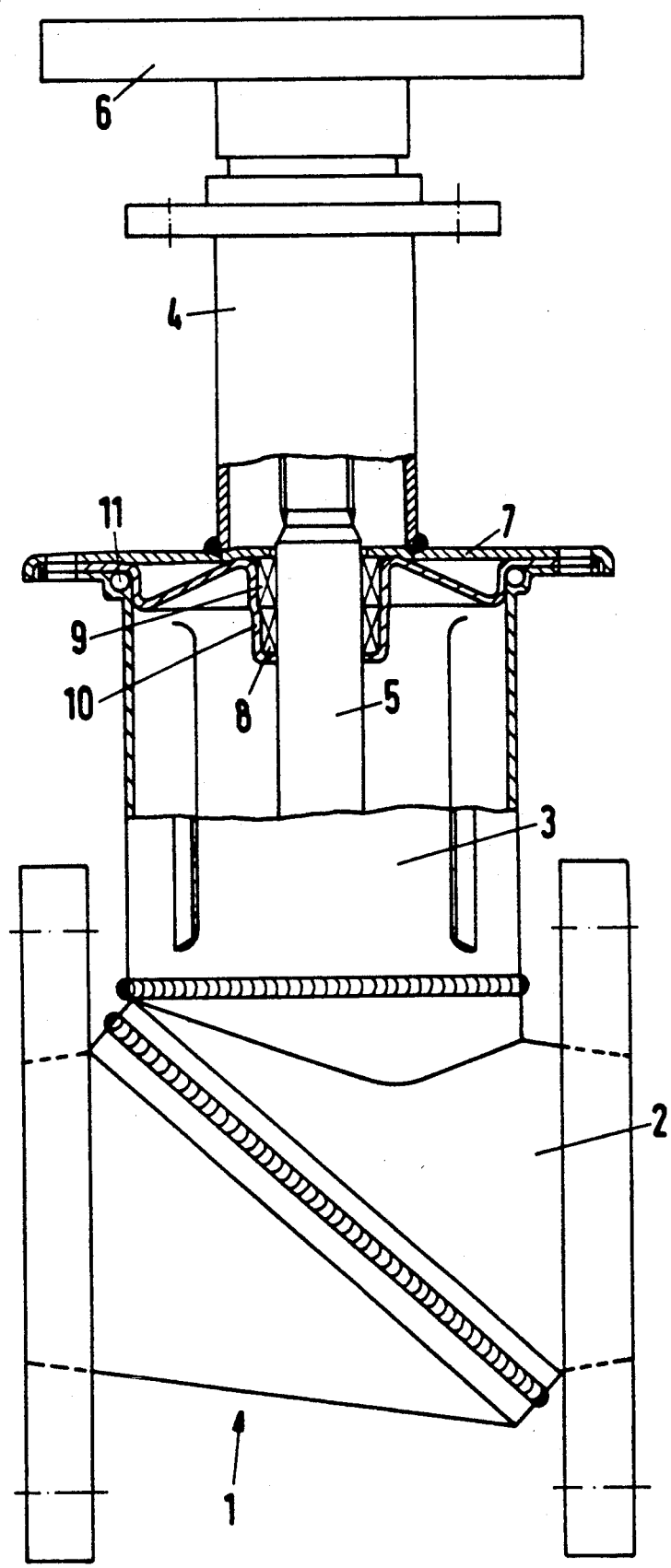
FIG. 1 shows a shutoff valve having a sheet metal housing and a sheet metal seal carrier for the spindle seal.

The valve housing 1, which is assembled from sheet metal parts by means of welding, consists essentially of a main portion 2, a housing attachment 3 and a cylindrical attachment 4 which is disposed above the housing attachment 3 and accommodates the operating mechanism of the shutoff valve.

A handwheel 6 serves to activate a closure element—not illustrated—affixed to a spindle 5.

The upper dividing wall between the interior of the valve housing 1 and the surroundings is a housing cover 7, and the spindle seal of the shutoff valve is located in the region of the housing cover 7. The components 8,9 serving as a spindle seal are received by a seal carrier 10 which is clamped between the housing attachment 3 and the housing cover 7. Sealing at the outer diameter of the seal carrier 10, and thus of the housing cover 7, is accomplished by an 0-ring 11 which is situated in a chamber defined by the housing attachment 3 and the flange 12 of the seal carrier 10.

The nature of the seal carrier and the different chamber configurations obtainable with the same internally of the housing allow a variety of sealing materials to be used in order to satisfy various requirements as regards pressure, temperature and the nature of the fluids to be passed through the valve. Elastomeric, fluorothermoplastic and graphite seals, in particular, come into consideration. It is even possible to selectively place different types of seals in the same chamber. A special design, or additional measures and means, are unnecessary.

Sealing can also be accomplished by a flat seal disposed between the housing attachment 3 and the housing cover 7.

Figure 2:
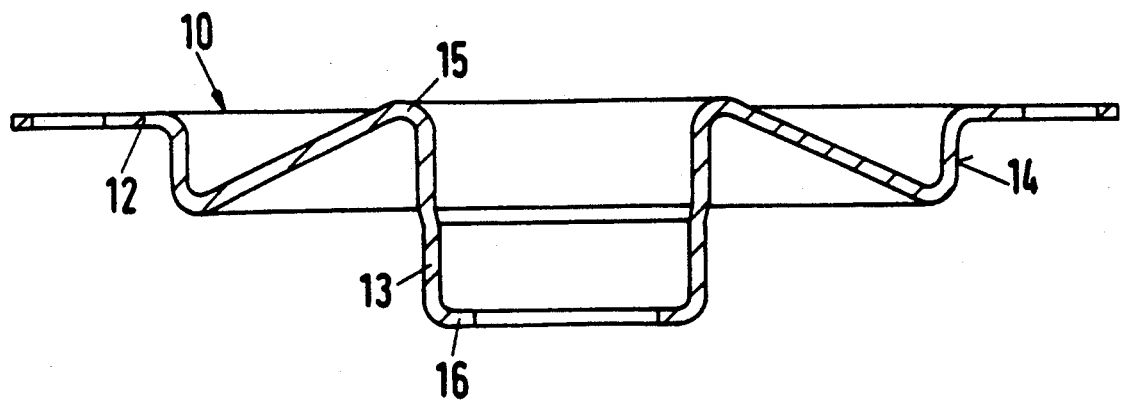
FIG. 2 is an enlarged view of the seal carrier of FIG. 1.

As is seen in FIG. 2, the seal carrier 10 defines a socket 13 at its center, and the socket 13 exhibits a diameter gradation in the direction of insertion of the seal 8,9. This assures consistent installation of the seal 8,9.

The periphery of the seal carrier 10 has a cylindrical centering section 14 which cooperates with the inner wall of the housing attachment 3. An arch 15 which circumscribes the upper edge of the socket 13 and engages in a corresponding recess of the housing cover 7 also serves for centering. Both measures constitute an effective aid during assembly of the shutoff valve.

The end face 16 of the seal carrier 10 defines an abutment for a part (e.g., a closure element) fixed to the spindle 5; it thus functions to limit the stroke of the shutoff valve. The end face 16 can, however, also be employed as a sealing accessory in a back seal for the spindle.

We claim:

1. A valve, comprising a housing having an upper portion; a valve actuating member extending into said housing; and a sealing unit for said actuating member, said sealing unit including a carrier which comprises a marginal portion, a centering portion extending from said marginal portion substantially perpendicular thereto and abutting said housing, an inclined portion extending from said centering portion into engagement with said upper portion and having an end, a socket portion extending downwards from said end and having a bottom, and an end face at said bottom provided with an opening for said actuating member, said socket portion surrounding and defining a gap with said actuating member, and said sealing unit further including a seal in said gap, said end face defining a support surface for said seal.

2. The valve of claim 1, wherein said socket portion is disposed substantially centrally of said carrier.

3. The valve of claim 1, wherein said seal comprises a sleeve which circumscribes said actuating member.

4. The valve of claim 1, wherein said carrier is mounted on said housing.

5. The valve of claim 1, wherein said end face defines a back seat for said actuating member.

6. The valve of claim 1, wherein said marginal portion cooperates with said housing to define a compartment; and further comprising an additional seal in said compartment.

7. The valve of claim 6, wherein said additional seal is substantially annular.

8. The valve of claim 1 wherein said carrier comprises sheet material.

9. The valve of claim 8, wherein said sheet material is deep drawn.

10. The valve of claim 8, wherein said centering portion comprises a protuberance which is formed from said sheet material.

11. The valve of claim 8, wherein said socket portion has an end in the region of a predetermined portion of said housing and said predetermined housing portion is provided with a recess, said carrier being provided with a centering section which is disposed adjacent said end of said socket portion and is received in said recess.

12. The valve of claim 11, wherein said centering section comprises a protuberance formed from said sheet material.

13. The valve of claim 11, wherein said centering section circumscribes said end.

* * * * *